United States Patent
Lewin et al.

(10) Patent No.: US 6,264,820 B1
(45) Date of Patent: Jul. 24, 2001

(54) GAS GENERATORS

(75) Inventors: Robert Glyn Lewin; Stephen Vernon Barnett; Andrew Timothy Ince; Christopher William Brace; Peter Hugh Middleton, all of Preston (GB)

(73) Assignee: British Nuclear Fuels PLC, Warrington (GB)

( * ) Notice: Subject to any disclaimer, the term of this patent is extended or adjusted under 35 U.S.C. 154(b) by 0 days.

(21) Appl. No.: 09/403,470
(22) PCT Filed: Apr. 24, 1998
(86) PCT No.: PCT/GB98/01048
  § 371 Date: Feb. 14, 2000
  § 102(e) Date: Feb. 14, 2000
(87) PCT Pub. No.: WO98/48923
  PCT Pub. Date: Nov. 5, 1998

(30) Foreign Application Priority Data

Apr. 28, 1997 (GB) .................................................. 9708548
Feb. 25, 1998 (GB) .................................................. 9803892

(51) Int. Cl.[7] ........................................................ C25C 1/10
(52) U.S. Cl. ........................ 205/634; 205/635; 205/636; 204/252; 204/265; 204/266; 204/272
(58) Field of Search ................................. 204/252, 265, 204/266, 272, 278.5; 205/628, 629, 630, 631, 632, 633, 634, 636, 637, 638, 639

(56) References Cited

U.S. PATENT DOCUMENTS

| | | | |
|---|---|---|---|
| 4,894,297 | * | 1/1990 | Singh et al. ............................ 429/31 |
| 5,021,304 | * | 6/1991 | Ruka et al. ............................. 429/30 |
| 5,273,628 | * | 12/1993 | Liu et al. ............................... 429/33 |
| 5,350,641 | | 9/1994 | Mogensen et al. ........................ 8/10 |
| 5,478,444 | * | 12/1995 | Liu et al. ............................... 429/33 |
| 5,508,127 | * | 4/1996 | Lewin et al. ............................ 429/30 |
| 5,616,223 | * | 4/1997 | Shen et al. ............................. 204/252 |
| 5,624,542 | * | 4/1997 | Shen et al. ............................. 429/33 |
| 6,013,386 | * | 1/2000 | Lewin et al. ............................ 429/30 |

FOREIGN PATENT DOCUMENTS 0 767 255 A1   4/1997   (EP) .

\* cited by examiner

*Primary Examiner*—Bruce F. Bell
(74) *Attorney, Agent, or Firm*—Workman, Nydegger & Seeley

(57) ABSTRACT

A gas generator comprising a layer of first material are provided with a layer of second material on one surface and a layer of third material on the other opposing surface is provided. The application of an external potential results in the flow of gas from one side of the generator to another due to the properties of the materials presented. The use of an electrolyte material as the first material and mixed conductors as the second and/or third materials is particularly beneficial in obtaining high flow rates. The use of the generator to produce oxygen for injection into a methane stream is particularly preferred.

25 Claims, 1 Drawing Sheet

GAS GENERATORS

BACKGROUND OF THE INVENTION

1. Field of the Invention

This invention is concerned with improvements in and relating to gas generators, particularly, but not exclusively, for the generation of oxygen.

2. Present State of the Art

Gas generators are used in a wide variety of applications to produce or separate gases for breathing, to provide gases for chemical reactions, to separate chemical compounds into their component parts of for other purposes. Such generators are used by pilots and medical establishments, amongst other users.

Gas generators should ideally provide a high gas flow rate, with maximum efficiency and at as low an operating temperature as possible. Existing technology faces problems in one or more of these areas and the present invention aims to provide an improved gas generator.

BRIEF SUMMARY OF THE INVENTION

According to a first aspect of the invention we provide a gas generator comprising a layer of a first material and provided with a layer of a second material on one surface and a layer of a third material on the other opposing surface, the application of an external potential resulting in a flow of gas from one side of the generator to another.

The flow of gas from one side to the other results in gas being generated or separated to one side of the generator. The flow through the material generally occurs in ionic form with discharge to gas at the exhausting side.

Preferably the first material is an electrolyte material. The first material may be ionically conducting. The first material may comprise zirconia. The first material may be doped with one or more other materials, for instance rare earth metals. The additional material, for instance yttria, may stabilise one or more of the other constituents of the first material. Zirconia doped with yttria forms a particularly preferred form for the first material. The first material may include 3 to 12 mol % and/or % by weight, of a doping agent, with 6 to 10 mol % and/or % by weight being preferred.

The second and third materials may be different or the same. Preferably the second and/or third materials are mixed conductors, most preferably for both electrons and ions of the gas, for instance oxygen. Preferably the second and/or third materials provide the principal electrode function for the generator.

Preferably the second and/or third materials are stable in an oxidising and reducing environment. A material comprising a ceramic oxide is preferred. Preferably the second and/or third materials comprise urania. Doped urania, for instance by one or more rare earth metals, is particularly preferred.

Urania doped with yttria may be provided. The urania may be provided as a solid solution with a further material. The further material may comprise one or more rare earth metals, such as yttria.

The urania may be depleted urania i.e. the $U^{235}$ content may be less than for naturally occurring urania.

The second and/or third material may be provided in a layer less than 150 micrometers and more preferably less than 100 micrometers thick.

One or more further layers may be provided on the second and/or third materials. The layer or layers may provide a current collecting and/or current distributing function for the generator.

The material on one of the second or third materials may comprise nickel oxide and/or zirconia. A mixed system, for instance in cermet form, is preferred.

The material on the second and/or third materials may comprise a cobalt and/or manganese oxide and/or oxide and/or perovskite system. Mixed oxide systems, such as lanthanum, strontium, cobalt, iron and manganese oxides are preferred. The material may particularly be formed of lanthanum strontium manganese cobaltite.

The external potential may arise from a chemical or activity difference between the materials adjoining the two sides of the gas generator. The activity or chemical difference may arise from one or more of, a difference in the level and/or temperature and/or state and/or pressure of one or more species and/or different species.

The anode side and cathode side of the generator are preferably electrically connected to one another by a circuit, for instance an external circuit. The circuit may be used to control the flow of electrons and/or ions generated by the external potential and/or may be used to apply the external potential, for instance from a power source.

The external potential may arise from a voltage or electrical potential applied or generated across the generator. The potential may arise from an external power source connected to one or more of the materials forming the gas generator. An electrical circuit connecting anode and cathode sides of the generator may be used.

One or both sides of the generator may be maintained in contact with a given batch of gas and/or vapour. One side may be depleted and the other enhanced in one or more gas levels in such a batch process. Alternatively one or both sides of the generator may be contacted with a changing volume of gas. The gas on one or both sides may periodically or constantly be replaced. In this continuous system the gas level on one side is improved by selective transfer of a component into it, whilst the gas level on the other side is reduced in that component so effectively increasing the level and/or purity of the other component on that side.

Preferably the external potential results in a flow of electrons through the first material. The electrons may flow, for instance via an external circuit, from the second material to the third, or vice versa. The ionic flux in the first material may complete the circuit. This may occur for instance in an activity or a chemical potential driven system. The ions electrons may flow from a layer on the second material via the first and third materials to a layer on the third material, or vice versa. This may occur where an electrical potential is applied across the generator.

Preferably the external potential results in a flow of gas ions through the first material from one side to another preferentially. The gas ions may flow from the second material to the third, or vice versa, via the first material. Preferably the gas ions reform gas molecules on reaching the second or third material. Preferably the gas molecules are exhausted to the volume surrounding the second or third material. Preferably the first material acts as a barrier to other materials, gases, ions in the feed.

The gas ions may be formed by the decomposition of a compound in contact with the second and/or third materials and/or layers present thereon. The compound decomposed may be water. The water may be in gaseous and/or vapour form. The decomposition may occur within the second and/or third layer. Preferably the layers on the second and third materials are different in such a case.

The gas ions may be formed by the decomposition of a gas molecule in contact with the second and/or third materials and/or layers present thereon. The molecule decomposed may be $O_2$. The decomposition may occur within the second and/or third layer. Preferably the layers on the second and third materials are the same in such a case.

The gas generated and/or purified and/or increased in concentration is preferably oxygen. The oxygen may be extracted from water. The gas may be extracted and/or purified and/or increased in concentration from air.

The gas generator may be formed of a plurality of generator elements of the type described. The generator elements may be provided in substantially planar form, for instance as a series of planar layers of the various materials. Square, rectangular or elongate elements may be provided.

In an alternative form one side layer may form the inner surface of a cylinder or other element with a central passage, the other layers being provided about the inner layer. In such a case the inner passage forms one side and the outer side the other side of the generator element. The layers may be provided in a concentric manner, for instance to form layers on a right cylinder or non-circular or non-regular cross-sections may be provided.

According to a second aspect of the invention we provide a method for generating gas comprising providing a gas generator comprising a layer of a first material and provided with a layer of a second material on one surface and a layer of a third material on the other opposing surface, and providing a gas source on at least one side of the gas generator and providing an external potential resulting in a flow of gas from one side of the generator to another.

The method may include the addition of the gas produced, preferably oxygen, to a gas stream. The addition may occur remote from or at a surface of the generator. The gas stream may include or consist of methane or natural gas. Other gaseous hydrocarbons may be present. The methane may be generated by the treatment of coal. The methane may be extracted from an oilwell or other oil production or processing facility.

The gas stream may flow past the surface of the generator, for instance from an entrance to an exit, most preferably in a continuous manner.

Preferably the method includes the reaction of the oxygen produced with methane to give CO and $H_2$. The reaction products may be further processed and/or catalysed to give higher weight hydrocarbons, such as diesel or petrol.

Other features presented elsewhere in the application, including the first aspect of the invention, may be provided.

BRIEF DESCRIPTION OF THE DRAWINGS

Various embodiments of the invention will now be described, by way of example only, with reference to the accompanying drawings in which.

DETAILED DESCRIPTION OF THE PREFERRED EMBODIMENT

Figure 1:
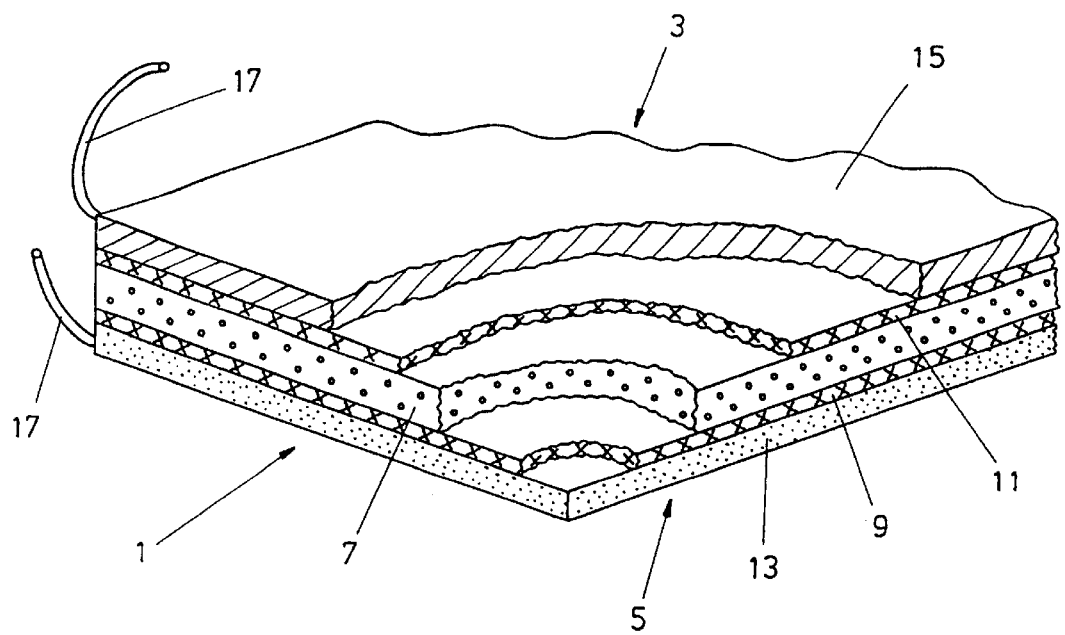
FIG. 1 shows a partially cross-sectioned perspective view of a first embodiment of the invention.

In the first embodiment of the invention illustrated in FIG. 1 the gas generator is formed of an assembly 1 with a first side 3 and second side 5. The space around the first and second sides are isolated from one another by the support structure, not shown, so as to maintain differences in the make up of the volume contacting the respective sides of the assembly.

The assembly consists of an electrolyte tile 7 with a interface layer mounted on either side 9, 11. The interface layers each carry current distributors 13, 15 which in turn are electrically conducted by leads 17 to a power source, not shown.

The electrolyte tile 7 is formed of sintered yttria stabilised zirconia.

The interface layers 9, 11 are formed of a mixture of particles. the first particles comprising a solid solution of yttria and uranium dioxide, the second type comprising zirconia.

The current collector 13, on the anode side of the assembly is formed of a nickel/zirconia cermet.

The current collector 15, on the cathode side of the assembly is formed of a lanthanum strontium manganese cobaltite, lanthanum strontium manganite or a perovskite.

In use water enriched gas, or water vapour is introduced to the cathode side of the assembly 1. The power source is then used to apply a voltage, for instance 1V, across the assembly 1 by leads 17 connected to current distributors 13, 15. The potential causes the conversion of water into its constituent components, hydrogen and oxygen ions. The oxygen ions produced are drawn through the tile 7 and exhausted at the anode side of the assembly. The hydrogen is exhausted at the cathode side of the assembly.

The net result is the production of oxygen which can then be used for the desired purpose by its transfer to the location of use. The depleted water side, with its increased level of hydrogen can be constantly or periodically replaced.

The gas produced, usually oxygen, can be used for a variety of purposes. The purity of the oxygen produced and the careful control of the level of oxygen produced make the technique particularly suitable for sensitive operations, such as those involved in semi-conductor manufacture, chemical vapour deposition and the like. The production of a pure oxygen output also renders the system useful for injecting oxygen into a carbon based gas to achieve an oxidation. This technique is applicable to generating CO and $H_2$ from a methane gas stream, for instance. This reaction is important in forming intermediaries in the production of petrochemicals from methane produced from coal and is also believed to offer a particularly suitable technique for generating useful and more readily handleable compounds from the methane off gas of oil extraction facilities. The generation of oxygen in this way is preferable to the provision of a cryogenic separator as the size and capital cost is reduced and the transportability of the system is greater.

In a second embodiment of the invention, not illustrated, the assembly acts more in the manner of a separator to generate gas useful for subsequent purposes.

A similar structure to that described above is employed, but the two current distributors are the same. In this embodiment both are formed from lanthanum strontium cobaltite, lanthanum strontium manganite or a perovskite.

In use oxygen is initially present on both sides of the assembly and an electrical potential is applied across the assembly as above. The resulting current flow produces a transfer of oxygen ions from the cathode. Over time this process results in the oxygen level on the anode side being enhanced and the oxygen level on the cathode side being depleted. The process can be continued until the oxygen on the cathode side is completely, or substantially, eliminated or until the desired enhancement on the anode side is achieved.

The process may be conducted as a batch process or one or both sides of the assembly may be continually replaced, for instance to maintain a suitable level of oxygen on the cathode side from which to extract.

In a third embodiment of the invention a similar structure is used for the assembly to that discussed above in relation to the second embodiment. However, instead of driving the system through an applied potential the system makes use of the potential arising according to the Nernst equation $$E = \frac{nF}{4RT} \ln \frac{Po'_2}{Po''_2}$$

such that an initial differential in the chemical species balance gives rise to a chemical potential. The difference in chemical potential gives rise to an electron flow and this in turn leads to a flow of oxygen ions. Once again the process results in the depletion of the oxygen level on the cathode side of the assembly and its enhancement on the anode side.

Once again a useful separation is achieved and the gas can be transferred to its location of use.

The electrolyte may be produced from an aqueous suspension, comprising zirconia and 5% polyvinyl alcohol solution, in combination with a dispersant and polyethylene glycol. The dispersion may be formed by ball milling the constituents together for several days. The suspension is then cast to the desired shape and allowed to dry at ambient temperatures. This stage is followed by sintering, with a maximum temperature of 1550° C.

A typical mix may comprise:

| | |
|---|---|
| 100 g | zirconia; |
| 100 g | 5% polyvinyl alcohol (MW up to 185000) in water; |
| 10 g | polyethylene glycol (MW up to 1500); |
| 5 g | dispersant. |

Other binders than PVA may be used and the zirconia may be doped with additional materials, such as rare earth metals.

The mixed oxide interlayer can be produced from an ink style suspension produced by mixing particles formed of a yttria/urania solid solution, together with zirconia, cod liver oil, polyvinyl butyral, polyethylene glycol, dibutyl phthalate and ethanol. The constituents can be mixed by ball milling together for several weeks.

A typical mix may comprise:

| | |
|---|---|
| 17.19 g | 50 mol % yttria/UO$_2$ solid solution; |
| 13.65 g | zirconia; |
| 0.81 g | cod liver oil; |
| 4.5 g | polyvinyl butyral; |
| 1.33 g | polyethylene glycol; |
| 1.2 g | dibutyl phthalate; |
| 36 g | ethanol; with |
| 20 g | terpineol added after ethanol evaporation. |

The resulting suspension can be screen printed or otherwise applied to the electrolyte, for instance by spraying. The combined form may then be sintered, again at a temperature below 1550° C.

The current distributors may be formed from an ink style suspension. For instance lanthanum strontium may be mixed with polyvinyl pyrrolidone and methanol in a ball mill for several weeks. The methanol may then be allowed to evaporate and terpiniol is added and stirred in. After application the assembly may be sintered, again at a temperature below 1550° C.

A typical mixture may comprise:

| | |
|---|---|
| 30 g | doped lanthanum strontium; |
| 30 g | methanol; |
| 1.59 g | polyvinyl pyrrolidone; with |
| 10 g | terpineol added after methanol evaporation. |

Figure 2:
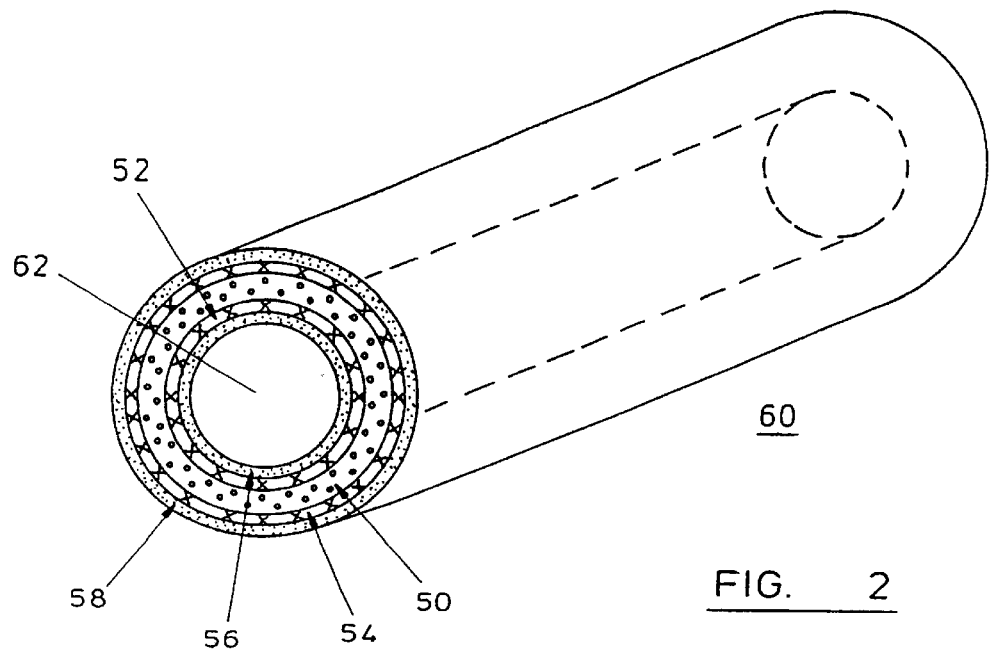
FIG. 2 shows a partially cross-sectioned perspective view of a second embodiment of the invention.

As an alternative to the plate style assemblies illustrated in FIG. 1, a tubular style generator be employed. Such a system, illustrated in FIG. 2, consists of a electrolyte tube 50 provided on its inner and outer surface with an interlayer 52, 54. Each interlayer is provided with a current distributor on its surface 56, 58, which can be connected to the power source where employed.

The physical constituents of the layers are as stated above in the other embodiments. The make up of the anode is determined according to whether a decomposition arrangement or separator system is to be employed.

A typical gas generator is likely to consist of many such tubes discretely spaced from one another. The gas/vapour on the outside 60 or inside 62 may form a continuous flow along the tubes. The internal flow may be countercurrent to the flow around the exterior of the tube.

The materials of the present invention offer a significant number of advantages over existing gas generators, with emphasis on higher current densities. In particular the assembly structure used offers a far higher active area due to the urania interlayer used. The greater area leads to higher product flow rates. Additionally the urania interlayer has a high catalytic activity which once again increases the performance of the generator due to improved kinetics.

The materials employed also allow the separator to be operated at lower temperatures, around 800° C., with benefits in terms of the life of the product and the reduced cost of the surrounding structure. Cost savings are also achieved in avoiding the use of platinum group catalysts within the assembly. The urania also offers significantly improved resistance to poisoning than many other materials.

What is claimed is:

1. A gas generator comprising a layer of a first material, provided with a layer of a second material on one surface and a layer of a third material on the other opposing surface, and further comprising means for applying an external electrical application of the external electrical potential resulting in a flow of gas from one side of the generator to another, wherein the first material is an electrolyte material and at least one of the second and third materials are mixed conductors.

2. A generator according to claim 1 in which the first material comprises zirconia.

3. A generator according to claim 1 in which the first material is doped with one or more other materials.

4. A generator according to claim 1 in which the second and/or third materials comprise a ceramic oxide.

5. A generator according to claim 4 in which the second and/or third materials comprise doped urania.

6. A generator according to claim 5 in which the urania is doped with one or more rare earth metals.

7. A generator according to claim 5 in which the urania is doped with yttria.

8. A generator according to any of claim 1 in which the second and/or third materials comprise urania provided as a solid solution with a further material.

9. A generator according to claim 8 in which the further material is one or more rare earth metals.

10. A generator according to claim 8 in which the further material is yttria.

11. A generator according to claim 1 in which one or more further layers are provided on the second and/or third materials, the layer or layers providing a current collecting and/or current distributing function for the generator.

12. A generator according to claim 1 in which the anode side and cathode side of the generator are electrically connected to one another by a circuit.

13. A generator according to claim 12 in which the circuit is used to control the flow of electrons and/or ions generated by the external potential and/or may be used to apply an external potential.

14. A generator according to claim 13 in which the external potential arises from a voltage or electrical potential applied or generated across the generator from an external power source connected to one or more of the materials forming the gas generator.

15. A method for generating gas comprising providing a gas generator comprising a layer of a first material, the first material being provided with a layer of a second material on one surface and a layer of a third material on the other opposing surface and means for applying an external electrical potential further comprising providing a gas source on at least one side of the gas generator and applying an external electrical potential, the external electrical potential resulting in a flow of gas from one side of the generator to another, wherein the first material comprises an electrolyte and at least one of second and third materials comprises a mixed conductor.

16. A method according to claim 15 in which one or both sides of the generator are maintained in contact with a given batch of gas and/or vapour, one side being depleted and the other enhanced in one or more gas levels.

17. A method according to claim 15 in which one or both sides of the generator are contacted with a changing volume of gas, the gas level on one side is improved by selective transfer of a component into it, whilst the gas level on the other side is reduced in that component so effectively increasing the level and/or purity of the other component on that side.

18. A method according to claim 15 in which the external potential arises from a chemical or activity difference between the materials adjoining the two sides of the gas generator.

19. A generator according to claim 18 in which the activity or chemical difference arises from one or more of a difference in the level and/or temperature and/or state and/or pressure of one or more species and/or different species.

20. A method according to claim 15 in which the external potential results in a flow of gas ions through the first material from one side to another preferentially.

21. A method according to claim 20 in which the gas ions are formed by the decomposition of a compound in contact with the second and/or third materials and/or layers present thereon.

22. A method according to claim 20 in which the gas ions are formed by the decomposition of a gas molecule in contact with the second and/or third materials and/or layers present thereon.

23. A method according to claim 15 in which the method includes the addition of the gas produced, to a gas stream.

24. A method according to claim 23 in which the gas stream includes a gas selected from the group consisting of methane and natural gas.

25. A method according to claim 24 in which the method includes the reaction of the oxygen produced with methane to give CO and $H_2$.

* * * * *

UNITED STATES PATENT AND TRADEMARK OFFICE
CERTIFICATE OF CORRECTION

PATENT NO. : 6,264,820 B1
DATED : July 24, 2001
INVENTOR(S) : Robert Glyn Lewin et al.

It is certified that error appears in the above-identified patent and that said Letters Patent is hereby corrected as shown below:

<u>Title page,</u>
Item [57], ABSTRACT,
Line 1, after "material" change "are" to -- and --

<u>Column 1,</u>
Line 12, after "parts" delete "of"

<u>Column 2,</u>
Line 45, after "system. The" change "ions" to -- ions' --

<u>Column 4,</u>
Line 10, before "the first" change "particles." to -- particles, --

<u>Column 5,</u>
Line 6, after "potential" insert a comma

<u>Column 6,</u>
Line 11, after "generator" insert -- can --

Signed and Sealed this

Fourth Day of March, 2003

JAMES E. ROGAN
*Director of the United States Patent and Trademark Office*